(12) United States Patent
Hannesen et al.

(10) Patent No.: US 7,880,664 B2
(45) Date of Patent: Feb. 1, 2011

(54) METHOD FOR CORRECTING WEATHER DATA

(75) Inventors: Ronald Hannesen, Düsseldorf (DE); Axel Kammer, Königswinter (DE); André Weipert, Wegberg (DE)

(73) Assignee: Selex Systems Integration GmbH, Neuss (DE)

( * ) Notice: Subject to any disclaimer, the term of this patent is extended or adjusted under 35 U.S.C. 154(b) by 0 days.

(21) Appl. No.: 11/920,493

(22) PCT Filed: May 12, 2006

(86) PCT No.: PCT/EP2006/004469

§ 371 (c)(1), (2), (4) Date: Nov. 16, 2007

(87) PCT Pub. No.: WO2006/122712

PCT Pub. Date: Nov. 23, 2006

(65) Prior Publication Data

US 2009/0066563 A1 Mar. 12, 2009

(30) Foreign Application Priority Data

May 19, 2005 (DE) ........................ 10 2005 023 787

(51) Int. Cl.
*G01S 13/95* (2006.01)
*G01S 7/292* (2006.01)
*G01W 1/00* (2006.01)
*G01S 13/00* (2006.01)
*G01S 7/28* (2006.01)

(52) U.S. Cl. .................. 342/26 D; 342/26 R; 342/89; 342/91; 342/159; 342/175; 342/192; 342/195; 342/196; 702/1; 702/2; 702/3

(58) Field of Classification Search ...... 342/26 R–26 D, 342/82–103, 159–176, 179, 188–197; 702/1–4
See application file for complete search history.

(56) References Cited

U.S. PATENT DOCUMENTS 4,139,847 A * 2/1979 Shimzu et al. ............ 342/26 D (Continued)

OTHER PUBLICATIONS

M. Steiner et al., "Use of Three-Dimensional Reflectivity Structure for Automated Detection and Removal of Nonprecipitating Echoes in Radar Data"; Journal of Atmospheric and Oceanic Technology; May 1, 2002; vol. 19; pp. 673-686; reprint on highbeam.com.*

(Continued)

*Primary Examiner*—Bernarr E Gregory
(74) *Attorney, Agent, or Firm*—Alix, Yale & Ristas, LLP

(57) ABSTRACT

The invention relates to a method, an apparatus and a computer program product for correcting the weather data of radial speed, spectral width and/or differential reflectivity which have been acquired from radar echo data recorded by a ground-based, radar-based remote-sensing appliance (1) for measuring atmospheric conditions and including evaluable weather echoes and interfering ground echoes, corrected weather data being obtained by calculating out the interfering ground echoes from the acquired weather data by using a previously stored clutter map with an intensity distribution of radar echo data which include the ground echoes substantially without weather echoes.

22 Claims, 3 Drawing Sheets

U.S. PATENT DOCUMENTS

| | | | | |
|---|---|---|---|---|
| 4,318,100 A | * | 3/1982 | Shimizu et al. | 342/26 D |
| 4,488,154 A | * | 12/1984 | Ward | 342/93 |
| 4,533,915 A | * | 8/1985 | Lucchi et al. | 342/26 B |
| 4,628,318 A | * | 12/1986 | Alitz | 342/26 D |
| 4,709,236 A | * | 11/1987 | Taylor, Jr. | 342/101 |
| 5,311,188 A | * | 5/1994 | Meijer et al. | 342/90 |
| 6,307,501 B1 | * | 10/2001 | Wills et al. | 342/161 |
| 6,771,207 B1 | * | 8/2004 | Lang | 342/2 R |
| 7,095,358 B2 | * | 8/2006 | Krikorian et al. | 342/159 |
| 7,259,714 B1 | * | 8/2007 | Cataldo | 342/159 |

OTHER PUBLICATIONS

S. Wesson et al., "Radar Rainfall Image Repair Techniques"; Hydrology and Earth System Sciences; vol. 8, No. 2; printed in the year 2004; pp. 220-234; European Geosciences Union; Katlenburg-Lindau, Germany.*

Patent Abstract of Japan, Publication No. 2001242246 A, dated Jul. 9, 2001.

Analysis of Polar55 Radar Data, Montagnana/Firenze, Italy; Part 1: Data Quality Analysis, Revised Version—Feb. 19, 2002, by Ronald Hannesen.

* cited by examiner

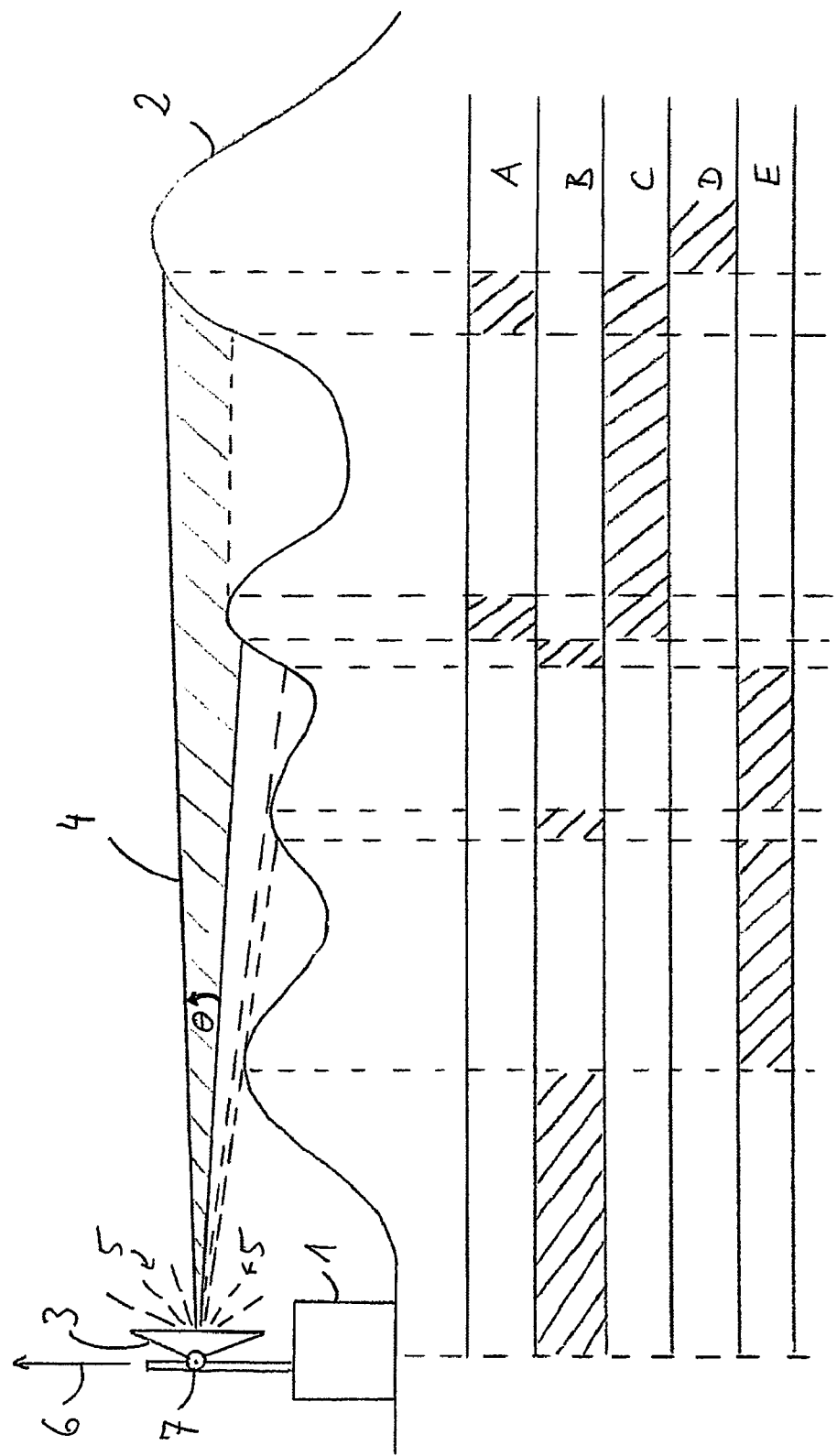

METHOD FOR CORRECTING WEATHER DATA

BACKGROUND

The invention relates to a method and an apparatus for correcting weather data.

During acquisition of weather data by means of a ground-based weather radar for example for weather observation in the vicinity of airports, ground echoes, that is to say echoes from obstacles such as buildings, hills/mountains, trees etc. are also recorded by the weather radar in addition to weather echoes, that is to say echoes from clouds and precipitation. Two approaches are known for filtering out the ground echoes, also denoted as clutter, from the intensity distribution of the echoes. On the one hand, a clutter map in which an intensity distribution is stored only with ground echoes and without weather echoes and which has been recorded under suitable weather conditions can be subtracted from the intensity distribution of a measurement corrupted by clutter. On the other hand, those areas which are sufficiently corrupted by clutter can be determined by comparing the measured values with values of the clutter map and can be replaced by interpolation or extrapolation from areas which are not sufficiently corrupted by clutter.

Both in the case of subtraction and that of interpolation or extrapolation, diverse thresholds and complex algorithms are to be used which additionally correct only the intensity of the echo. No suitable correction options are known for the weather data of radial speed, spectral width and differential reflectivity.

SUMMARY

It is therefore the object of the invention to provide a method and an apparatus for correcting weather data, with which the weather data of radial speed, spectral width and differential reflectivity can be reliably and easily corrected.

It is thereby also possible for weather data of the type of radial speed, spectral width and differential reflectivity to be cleared from clutter in an automated fashion. The automated correction of these weather data enables, for example, an improvement in the reliability of the detection of bad weather, including in the case of hydrological applications, which previously, that is to say when only intensity values were corrected, frequently supplied incorrect results.

Further refinements of the invention are to be gathered from the following description and the subclaims.

The invention is explained in more detail below with the aid of the exemplary embodiments illustrated in the attached figures, in which:

BRIEF DESCRIPTION OF THE DRAWING

FIG. 1 illustrates a ground-based, radar-based remote-sensing unit,

DETAILED DESCRIPTION

Figure 2B:
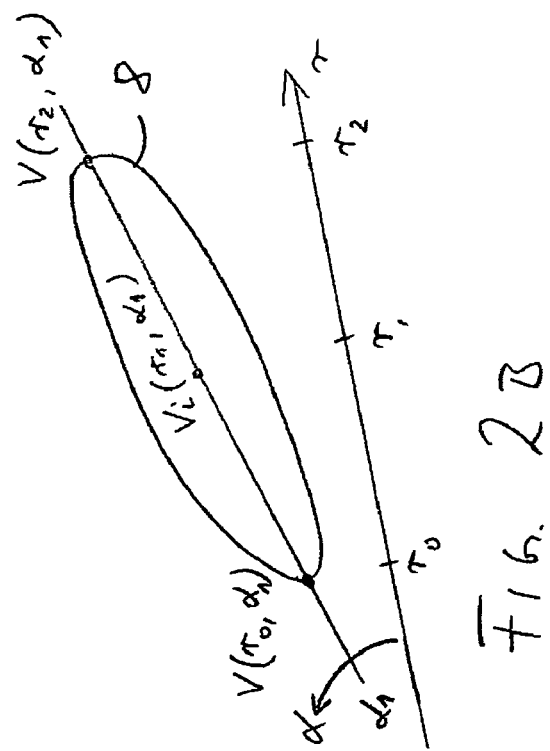
FIGS. 2A, 2B respectively illustrate an interpolation

The remote-sensing unit illustrated in FIG. 1 in the form of a weather radar 1 on the surface of the earth 2 comprises a rotatable and/or pivotable transmitting/receiving mirror 3 for an expediently pulsed electromagnetic beam of a wavelength, particularly in the microwave region, and having a major radiation lobe 4 which is illustrated with 3 dB width θ, and a number of minor radiation lobes 5.

In operation, the illustrated weather radar 1 is rotated about a vertical axis 6, and/or pivoted about an expediently co-rotating transverse axis 7 in order to scan a solid angle or, if appropriate, a plane angle. In this case, the transmitting/receiving mirror 3 emits electromagnetic pulses which, as the case may be, are partially reflected and/or absorbed by objects such as clouds, precipitation, buildings or the surface 2 of the earth, and produce detectable echo pulses with amplitude, phase and/or polarization at the transmitting/receiving mirror 3. The echo pulses are acquired as a function of the angle of rotation and/or of the pivoting angle, as well as of the distance, calculated from the travel time between emission of a pulse and reception of the echo pulse, of an echo-producing object, and expediently stored for evaluation. Radar echo data are obtained in this way which contain information relating to each point in the scanned spatial region within the scope of the attainable resolution.

It is not only targets desired for weather reconnaissance, such as clouds and precipitation, which produce echoes but also undesired targets such as buildings or the surface 2 of the earth. Areas which produce ground echoes are illustrated by hatching in row A for the major radiation lobe 4, and in row B for the minor radiation lobes 5. In addition, the undesired targets give rise to partial and complete shadings, which are illustrated by hatching in rows C and D, respectively, of FIG. 1. In the case of the position of the weather radar 1 illustrated in FIG. 1, targets desired for weather reconnaissance are neither disturbed by ground echoes nor shaded only in the area hatched in row E.

The first step toward correcting the weather data, supplied by the weather radar 1 on the basis of radar echo data, of radial speed V, spectral width W and/or differential reflectivity ZDR is to draw up a clutter map $Z_{Cl}$, that is to say an intensity distribution of ground echoes without weather echoes. This can be undertaken under conditions free from weather echoes and, if appropriate, be optimized by hand or automatically, in particular by averaging various recordings. Like the weather data V, W and ZDR, the clutter map $Z_{Cl}$ is expediently three-dimensional and a function of the distance r, the angle of rotation α and the pivoting angle β, but can also be two-dimensional, as a function of the distance r and the angle of rotation α, or only one dimensional as a function of the distance r. Cartesian coordinates are used, if appropriate. The coordinate step size of the clutter map $Z_{Cl}$ expediently corresponds to the coordinate step size of the weather data V, W, ZDR.

The weather data are corrected as follows.

A corrected radial speed $V_{Wea}$ is calculated according to $$V_{Wea} = V(Z_{Cl} + Z_{Wea})/Z_{Wea} \quad (1)$$

V being the as yet not corrected radial speed, $Z_{Cl}$ the intensity from the clutter map, and $Z_{Wea}$ the intensity of the weather signal.

A corrected spectral width $W_{Wea}$ is calculated according to $$W_{Wea} = W(Z_{Cl} + Z_{Wea})/Z_{Wea} \quad (2)$$

W being the not yet corrected spectral width, $Z_{Cl}$ the intensity from the clutter map, and $Z_{Wea}$ the intensity of the weather signal.

A corrected differential reflectivity $ZDR_{Wea}$ is calculated according to $$ZDR_{Wea} = ZDR(Z_{Cl} + Z_{Wea})/Z_{Wea} - ZDR_{Cl}Z_{Cl}/Z_{Wea} \quad (3)$$

ZDR being the not yet corrected differential reflectivity, $Z_{Cl}$ the intensity from the clutter map, $Z_{Wea}$ the intensity of the weather signal, and $ZDR_{Cl}$ the differential reflectivity from the clutter map.

When the condition $$Z_{Wea} < Z_{Cl} \qquad (4)$$

and, in particular, $$Z_{Wea} \ll Z_{Cl} \qquad (5)$$

is fulfilled, the equations (1) to (3) can supply unstable results. In this case, the respective weather data are expediently calculated as follows from at least two independently obtained corrected values by forming weighted means.

At least two of the following values can expediently be used for the radial speed V and combined in a weighted fashion:

$V_{Wea}$ according to equation (1) can be used as a $W_1$ value, if appropriate with a weighting function $g_1$ which increases with increasing factor $Z_{Wea}/Z_{Cl}$.

Further values $W_2$, $W_3$, $W_4$ can be determined by means of interpolation. The values $W_2$, $W_3$, $W_4$ are expediently interpolated from adjacent data, which is unaffected by clutter, for V along in each case one of the three axes of the coordinate system used, for example along the angle of rotation $\alpha$, the pivoting angle $\beta$ and/or the distance r.

Figure 2A:
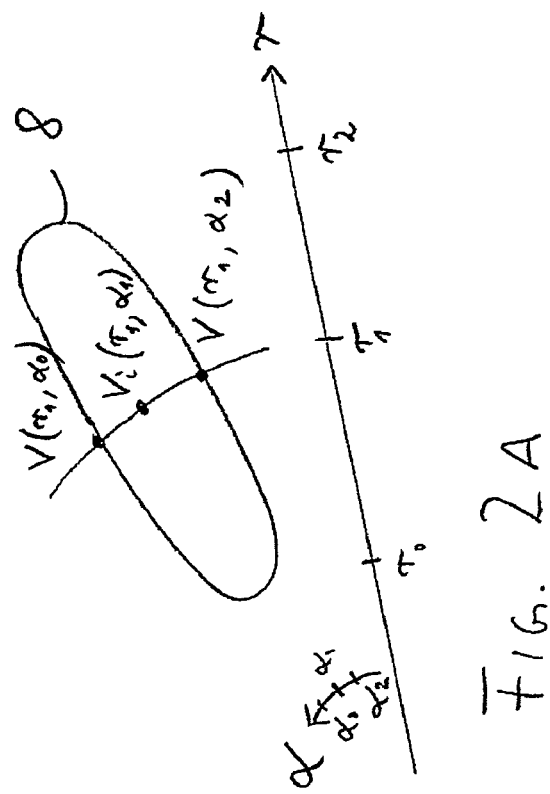

The interpolation is illustrated by an example for the axis $\alpha$ in FIG. 2A. Because of ground echoes, the two-dimensional coordinate area 8 illustrated there exhibits entries in the clutter map. The area of the measured radial speed V corresponding in terms of coordinates is replaced by interpolated values. The value $V_i$ ($r_1$, $\alpha_1$) interpolated here between the measured values V ($r_1$, $\alpha_0$) and V ($r_1$, $\alpha_2$) is illustrated by way of example:

$$W_2 = V_i(r_1,\alpha_1) = f(\alpha_1)V(r_1,\alpha_0) + (1-f(\alpha_1))V(r_1,\alpha_2). \qquad (6)$$

A value between 0 and 1 can be prescribed either permanently or in accordance with a function $f(\alpha)$ for the interpolation factor $f(\alpha_1)$, the function $f(\alpha)$ expediently varying linearly between $f(\alpha_0)=1$ and $f(\alpha_2)=0$ such that the interpolation factor amounts to $f(\alpha_1)=\frac{1}{2}$ for $\alpha_1=\frac{1}{2}(\alpha_0+\alpha_2)$.

If appropriate, there is provided for the value $W_{2\,a}$ weighting function $g_2$ which expediently decreases with increasing distance for example $\Delta=\alpha_2-\alpha_1$, in the three-dimensional space between the coordinate triples of the values of V used for interpolation.

An interpolation along the axis $\beta$ can be carried out for the value $W_3$ and is similar to the interpolation along the axis $\alpha$ for the value $W_2$. Certainly, this is not possible, for example, in the area illustrated in row C in FIG. 1, since no unaffected area is present there at the ground. However, if it is possible in exceptional cases to record measured values below transversely extending or punctiform obstacles, for example, the value $W_3$ can reasonably be calculated and used.

An interpolation along the axis r can be carried out as indicated in FIG. 2B for the value $W_4$. The value $V_1$ ($r_1$, $\alpha_1$) illustrated by way of example is interpolated here between the measured values V ($r_0$, $\alpha_1$) and V ($r_2$, $\alpha_1$):

$$W_4 = V_i(r_1,\alpha_1) = f(r_1)V(r_0,\alpha_1) + (1-f(r_1))V(r_2,\alpha_1). \qquad (7)$$

A value between 0 and 1 can be prescribed for the interpolation factor $f(r_1)$ either permanently or corresponding to a function $f(r)$, the function $f(r)$ expediently varying linearly between $f(r_0)$ and $f(r_2)=0$ such that the interpolation factor amounts to $f(r_1)=\frac{1}{2}$ for $r_1=\frac{1}{2}(r_0+r_2)$.

If appropriate, there is provided for the value $W_{4\,a}$ weighting function $g_4$ which expediently decreases with increasing distance for example $\Delta=r_2-r_0$, in the three-dimensional space between the coordinate triples of the values of V used for interpolation.

A further value $W_5$ can be calculated on the basis of a vertical extrapolation, particularly in the case of a shading in a vertical fashion from top to bottom, as for the area in row C of FIG. 1. The vertical extrapolation is expediently carried up through the individual ($\alpha$, r) planes, which are fixed by the $\beta$ coordinates in the scanned space, along $\beta$ or, if appropriate, along the Cartesian coordinate z, in each case downwards from the unaffected area above the shading into the shaded area. If appropriate, there is provided for the value $W_5$ a weighting function $g_5$ which expediently decreases with increasing vertical distance in the three-dimensional space relative to the unaffected area used for extrapolation, and/or increases with a measure of reliability of a previously determined vertical profile of the radial speed. To the extent that a value $W_3$ can be calculated for a vertical interpolation, it is possible to dispense with $W_5$ or to set the weighting function $g_5$ to a small value or to 0.

Any desired number i can be combined linearly or by means of the respective weighting function to form a single corrected value $V_{Wea}$ for the radial speed at the respective point from the independently calculated corrected values $W_1$ to $W_5$:

$$V_{Wea} = \sum_i g_1 W_1, \; i = 1, 2, 3, \ldots \qquad (8)$$

For the further weather data of spectral width and differential reflectivity, it is possible to make use as value $W_1$, of $W_{Wea}$ according to equation (2) and/or of $ZDR_{Wea}$ according to equation (3) and, similarly, of values $W_2$ to $W_5$ calculated in relation to radial speed, and weighting functions $g_1$ to $g_5$.

In addition, the weighting functions can, in particular, fall or rise discontinuously to 0 or 1, if appropriate 1/i for interpolation and extrapolation, when empirically prescribable thresholds are overshot or undershot, for example when the distance between the values used for interpolation is excessively large or sufficiently small.

Figure 3:
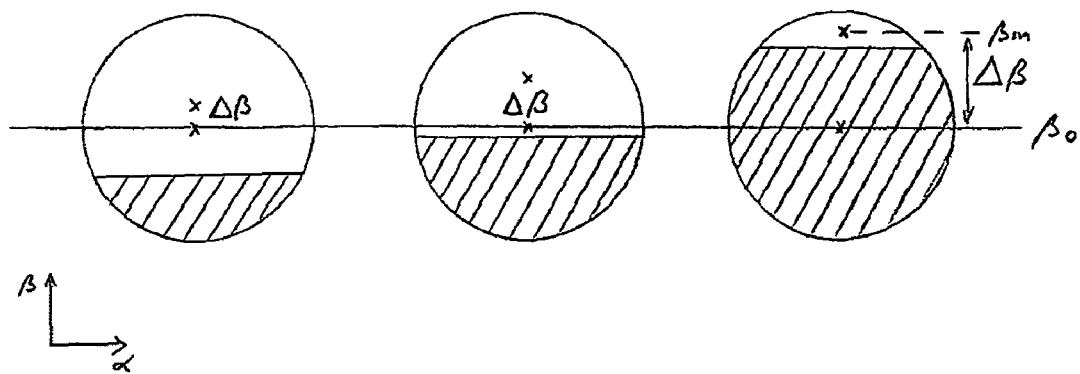
FIG. 3 illustrates shadings.
Figure 4:
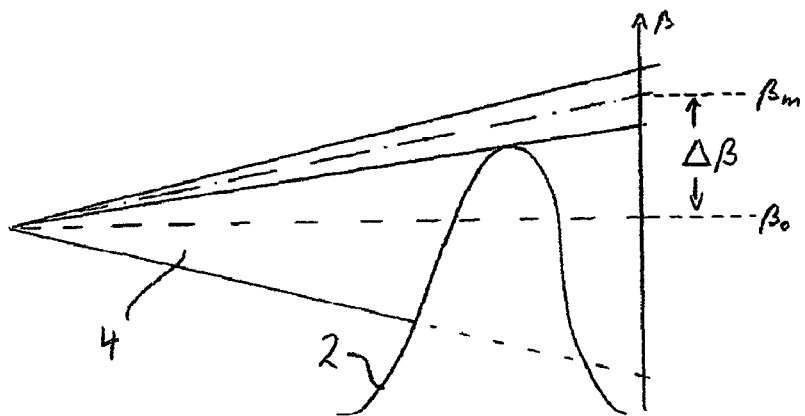
FIG. 4 illustrates the calculation of a height difference.

The major radiation lobe 4 is partially shaded in the area hatched in row C of FIG. 1. A cross section through the major radiation lobe 4 for various values of shading is illustrated in FIG. 3. According to the invention, when correcting the weather data the height difference $\Delta\beta$, illustrated in FIGS. 3, 4, between the mean height $\beta_m$ of the remaining part of the partially shaded major radiation lobe 4 and the middle $\beta_0$ of the major radiation lobe 4 is taken into account in such a way that a measured value for a weather datum is assigned not to coordinate $\beta_0$ but to coordinate $\beta_m=\beta_0+\Delta\beta$.

The mean height $\beta_m$ of the remaining part of the partially shaded major radiation lobe 4 is expediently calculated from the intensity distribution I($\alpha$, $\beta$) of the radar beam. Here, the intensity distribution is taken into account over the entire cross section in which the radar beam exhibits a low intensity which cannot be neglected. This cross section is greater than the illustrated 3 dB cross section and depends on the geometry of the transmitting/receiving mirror 3. For the purposes of illustration, $\beta_m$ is illustrated to coarse approximation in the middle of the remaining part of the partially shaded major radiation lobe 4.

The height difference $\Delta\beta$ can be used to extrapolate from a vertical profile of the respective weather data. For this purpose, the measured vertical profile is lengthened downwards by the height difference $\Delta\beta$ together with an associated weather data value and extrapolation is carried out vertically downwards on the basis of the lengthened vertical profile. If appropriate, the corrected value thus obtained is used as further value $W_6$ for the weighted combination with the values $W_1$ to $W_5$. It is possible here to make use of a weighting function $g_6$ which, for example, decreases with an increasing degree of shading or with increasing height different $\Delta\beta$.

The method can be carried out in an apparatus, downstream of the weather radar, in the form of a data processing system having a data input device receiving the weather data to be corrected, and a data output device for outputting the corrected weather data. To this end, a computer program product required for carrying out the method and containing instructions and data can be loaded into the apparatus via a data medium and/or a data network.

The invention claimed is:

1. A method for correcting weather data which is at least one of the group consisting of radial speed, spectral width and differential reflectivity, which weather data has been determined from radar echo data recorded by a ground-based, radar-based remote-sensing appliance for measuring atmospheric conditions, said echo data including evaluable weather echoes and interfering ground echoes, wherein the improvement comprises correcting and re-determining said weather data for the influence of interfering ground echoes by using a previously stored clutter map with an intensity distribution of radar echo data which include the ground echoes substantially without weather echoes.

2. Method according to claim 1, wherein the corrected radial speed $V_{Wea}$ is calculated according to $V_{Wea}=V\,(Z_{Cl}+Z_{Wea})/Z_{Wea}$, V being the radial speed determined from the radar echo data, $Z_{Cl}$ being the echo intensity from the clutter map, and $Z_{Wea}$ being the intensity of the radar echo data.

3. Method according to claim 1 wherein the corrected spectral width $W_{Wea}$ is calculated according to $W_{Wea}=W\,(Z_{Cl}+Z_{Wea})/Z_{Wea}$, W being the spectral width determined from the radar echo data, $Z_{Cl}$ being the intensity from the clutter map, and $Z_{Wea}$ being the echo intensity of the weather signal radar echo data.

4. Method according to claim 1, wherein the corrected differential reflectivity $ZDR_{Wea}$ is calculated according to $ZDR_{Wea}=ZDR\,(Z_{Cl}+Z_{Wea})/Z_{Wea}-ZDR_{CL}\,Z_{CL}/Z_{Wea}$, ZDR being the differential reflectivity determined from the radar echo data, $Z_{Cl}$ being the echo intensity from the clutter map, $Z_{Wea}$ being the intensity of the radar echo data, and $ZDR_{CL}$ being the differential reflectivity from the clutter map.

5. Method according to claim 1, wherein the corrected weather data is calculated by forming the weighted mean of at least two independently obtained weather data values.

6. Method according to claim 5, wherein the calculation is carried out by forming the weighted mean whenever the condition $Z_{Wea}<Z_{Cl}$ is fulfilled.

7. Method according to claim 6, wherein use is made of corrected radial speed $V_{Wea}$ as one of the values, where the corrected radial speed $V_{Wea}$ is calculated according to $V_{Wea}=V\,(Z_{Cl}+Z_{Wea})/Z_{Wea}$, V being the radial speed determined from the radar echo data, $Z_{Cl}$ being the echo intensity from the clutter map, and $Z_{Wea}$ being the intensity of the radar echo data.

8. Method according to claim 6, wherein use is made of corrected spectral width $W_{Wea}$ as one of the values where corrected spectral width is calculated according to $W_{Wea}=W\,(Z_{Cl}+Z_{Wea})/Z_{Wea}$, W being the spectral width determined from the radar echo data, $Z_{Cl}$ being the intensity from the clutter map, and $Z_{Wea}$ being the echo intensity of the radar echo data.

9. Method according to claim 6, wherein use is made of the corrected differential reflectivity $ZDR_{Wea}$ as one of the values where corrected spectral width is calculated according to $ZDR_{Wea}=ZDR\,(Z_{Cl}+Z_{Wea})/Z_{Wea}-ZDR_{CL}\,Z_{CL}/Z_{Wea}$, ZDR being the differential reflectivity determined from the radar echo data, $Z_{Cl}$ being the echo intensity from the clutter map, $Z_{Wea}$ being the intensity of the radar echo data, and $ZDR_{CL}$ being the differential reflectivity from the clutter map.

10. Method according to claim 5 wherein use is made of corrected radial speed $V_{Wea}$ as one of the values, where the corrected radial speed $V_{Wea}$ is calculated according to $V_{Wea}=V\,(Z_{Cl}+Z_{Wea})/Z_{Wea}$, V being the radial speed determined from the radar echo data, $Z_{Cl}$ being the echo intensity from the clutter map, and $Z_{Wea}$ being the intensity of the radar echo data.

11. Method according to claim 5, wherein one of the values is calculated by radial interpolation from areas (E) unaffected by clutter.

12. Method according to claim 11, wherein a weighting function which decreases with an increasing distance between the closest areas (E) unaffected by clutter is used for weighting.

13. Method according to claim 12, wherein at least one of an azimuthal distance and a radial distance are used.

14. Method according to claim 11, wherein areas in which the ratio of the intensities of the weather echoes and ground echoes lies above a prescribable threshold are used as areas (E) unaffected by clutter.

15. Method according to claim 11, wherein areas in which the shading lies below a prescribable threshold are used as areas (E) unaffected by clutter.

16. Method according to claim 5, wherein one of the values is used through vertical extrapolation from a vertical profile of the radial speed, the spectral width and the differential reflectivity.

17. Method according to claim 16, wherein a weighting function which decreases with increasing vertical distance from the closest area unaffected by clutter is used for weighting.

18. Method according to claim 16 wherein a weighting function which increases with increasing reliability of the vertical profile is used for weighting.

19. Method according to claim 5, wherein the mean height ($\beta_m$) of the remaining part of a radar beam partially shaded by an obstacle is determined, and one of the values is calculated, taking account of the mean height ($\beta_m$), from a vertical profile of the respective weather data acquired from the radar echo data.

20. Method according to claim 19, wherein the shading is calculated, and a weighting function which decreases with increasing shading is used for weighting.

21. Method according to claim 5, wherein use is made of corrected spectral width $W_{Wea}$ as one of the values where corrected spectral width is calculated according to $W_{Wea}=W\,(Z_{Cl}+Z_{Wea})/Z_{Wea}$, W being the spectral width determined from the radar echo data, $Z_{Cl}$ being the intensity from the clutter map, and $Z_{Wea}$ being the echo intensity of the radar echo data.

22. Method according to claim 1, wherein corrected weather data is calculated by forming the weighted mean of at least two independently obtained weather data values, one of said values corrected for the influence of interfering ground echoes by using a previously stored clutter map with an intensity distribution of radar echo data which include the ground echoes substantially without weather echoes, and a weighting function which increases with an increasing factor $Z_{Wea}/Z_{Cl}$ is used for weighting, $Z_{Cl}$ being the echo intensity from the clutter map, and $Z_{Wea}$ being the intensity of the radar echo data.

* * * * *